April 3, 1951 W. F. SIVEY ET AL 2,547,788
ARTIFICIAL FLY
Filed Jan. 21, 1949

INVENTOR.
William F. Sivey
Delia I. Sivey
BY
Thos. E. Scofield
ATTORNEY.

Patented Apr. 3, 1951

2,547,788

UNITED STATES PATENT OFFICE 2,547,788

ARTIFICIAL FLY

William F. Sivey and Delia I. Sivey,
Tecumseh, Nebr.

Application January 21, 1949, Serial No. 71,864

6 Claims. (Cl. 43—42.25)

Our invention relates to fishing lures.

The principal purpose of our invention is to provide a new and improved fishing lure that has a striped appearance and to provide a new and improved method of making such a lure. The fishing lure is made of a striped appearance to simulate certain insects and flies that have a striped or substantially striped body portion, so as to give said body portion a life-like appearance in the water that will attract the fish.

The fishing lure is provided on a hook and the hook is utilized as the means upon which the striped body portion of the lure and, if desired, a hackle, is mounted. By utilizing our method of making such a striped body portion on a fishing lure, such as a fly or similar device, a very natural life-like appearing lure is produced, which has great durability. The durability of the lure is obtained by making the striped body portion in a series of knots tied around the shank portion of the hook so that each knot is independently secured to the shank of the hook and at the same time the knots collectively form the stripes of the body portion.

It is a particular purpose of our invention to provide a body portion of a fishing lure that is of a striped appearance, by a method that involves utilizing a pair of contrasting cords that are knotted about the shank or body portion of the hook in such a manner that there is a row of knots formed on diametrically opposite sides of the shank portion, with always the cord of the same color outwardly, whereby a stripe of said color is formed on diametrically opposite sides of said shank portion and stripes of the contrasting color are formed between the two diametrically opposite stripes, these contrasting stripes also lying opposite each other along the shank of the hook in a position substantially ninety degrees around the circumference of the shank portion from the first mentioned stripes.

Other objects and advantages of our invention will appear as the description of the drawings proceeds. We desire to have it understood, however, that we do not intend to limit ourselves to the particular details shown or described, except as defined in the claims.

Figure 1:
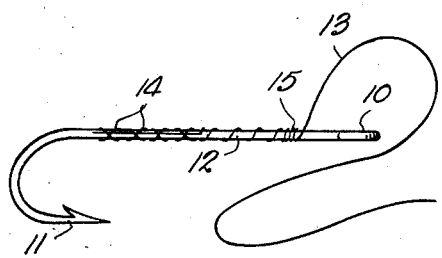
Fig. 1 is a view in elevation of a fish hook, showing the first step in the application of a binding thread to the hook.

Referring in detail to the drawings, a fish hook having an eye 10 at one end thereof, a barbed hook 11 at the other end thereof, and a shank portion 12 is utilized for the lure. A binding thread 13, which may be black, is secured to the shank portion 12 in any desired fashion, for example, by laying one end of the thread along the shank and anchoring that end by wrapping a plurality of turns 14 spirally over same in a criss-cross pattern, as will be clear from Fig. 1. The free end of the binding thread then is wound around the shank 12 a plurality of times, as indicated at 15, to anchor the same to the shank near the eye 10.

Figure 2:
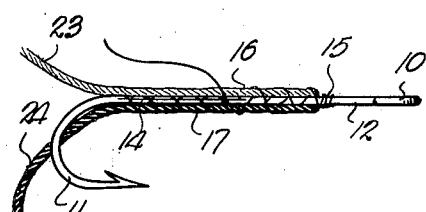
Fig. 2 is a similar view, showing the contrasting cords in position on diametrically opposite sides of the shank portion of the hook before securement to the hook.
Figure 3:
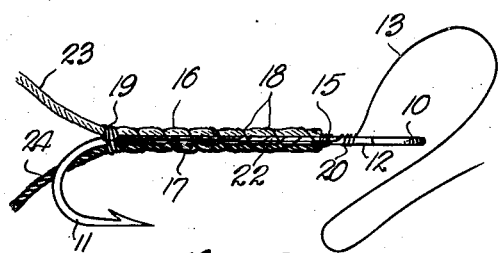
Fig. 3 is a similar view, showing the binding thread in position on said shank to hold the cords in a position parallel to the length of said shank on opposite sides thereof.
Figure 7:
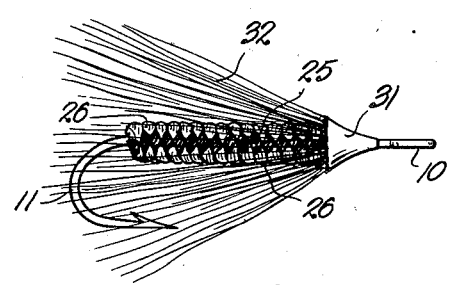
Fig. 7 is a view similar to Fig. 5, showing the hackle applied to the hook having the body portion thereon shown in Fig. 5.

Two cords of contrasting color 16 and 17 are then laid alongside the shank portion 12, as shown in Fig. 2, over the spirals 14 of binding thread wound upon said shank, said cords 16 and 17 extending considerably beyond the hook end 11 of the fish hook, as a greater length of the cords 16 and 17 will be necessary to form a knotted body portion than the lengths that are laid along the shank 12. The lengths that lie beside the shank 12 preferably are arranged substantially diametrically opposite each other and are held in position by wrapping the free end of the thread 12 spirally over cords 16 and 17, as indicated at 18. The spirally wound portion 18 extends from the secured portion 15 over the cords 16 and 17 toward the hook end 11, as will be obvious from Figs. 2 and 3. In order to anchor the spirals 18 in place thread 13 is wound or tied a plurality of times around the shank 12 and the cords 16 and 17 as indicated at 19, and then is passed lengthwise of the shank back to a point between the portion 15 and the eye 10 and is tied around the shank 12 a plurality of times, as at 20, to firmly anchor said thread 13 to the shank. The length of thread 13 extending from this anchored portion 20 is for use in securing the hackle in a manner to be described below. The longitudinally extending portion of the thread 13 is indicated by the numeral 22 in Fig. 3.

The cords 16 and 17 have long end portions 23 and 24 that are woven or tied in rows of knots on the shank 12. The rows of knots start at a point adjacent the hook 11, where the cords 16 and 17 are secured by means of the binding thread 13 at 19, and they run lengthwise of the shank 12 toward the eye 10. These knots are formed on diametrically opposite sides of the shank 12 and are all alike. The knots are drawn up in close adjacency to each other as the same are formed, so as to form a substantially continuous solid body portion from one end to the other end of said rows, and each knot embraces or encompasses within it the shank 12 so that every knot is securely fixed on the shank. Furthermore each of said knots encompasses the longitudinally extending portions of the cords 16 and 17, as well as the length of binding thread 22 that runs along the same over the spirally wound binding thread portion 18.

It is meant, by saying that the knots are all tied in the same manner, that the cord of a particular color is always outward at the same portion of every knot. As a result, with the knots tied side by side on opposite sides of the shank 12 there will be rows of exposed portions 25 and rows of exposed portions 26 of the two contrasting colored cords arranged side by side lengthwise of the body portion of the lure. This will give a longitudinally striped appearance to the body portion of the lure that is very desirable. The portions 25 in the drawings are indicated as being a dark color, while the portions 26 are indicated as being a light color. For example, assuming cord 17 to be red and cord 16 to be white, the portions 25 would be red and the portions 26 white.

Figure 4:
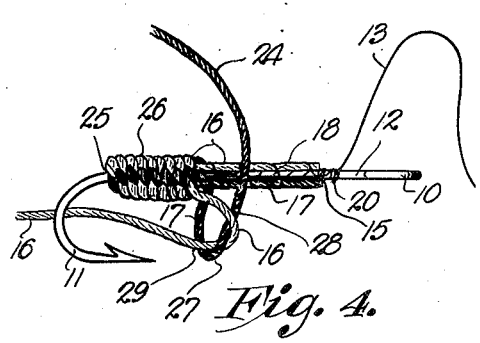
Fig. 4 is a view in elevation, showing the knotted formation partly completed on the shank of the hook and one of the knots in the course of tying.

In Fig. 4 the tying of one of the knots is illustrated. The cord 16, which extends from the outwardly facing side of the shank 12 (i. e., the side nearest the leader), has the contrasting cord 17 which extends from the diametrically opposite side of the shank 12, first passed over it, as indicated at 27, and then passed under it, as indicated at 28, the free end of 16 passing over the cord 17 at 29 so that the two cords 16 and 17, when drawn up tight, will form a single knot made up of the two contrasting strands, but with the shank 12 and the parallel length of the cords 16 and 17 lying adjacent the same included in or embraced by the knot.

Figure 5:
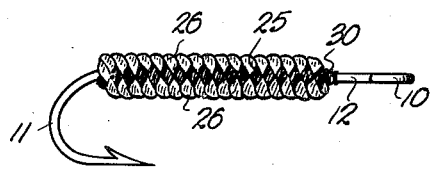
Fig. 5 is a view in elevation of the hook in the same position as viewed in Fig. 1, but with the body portion of the lure completed.
Figure 6:
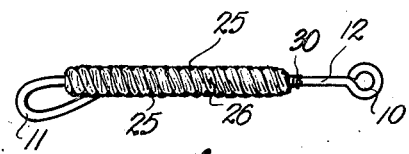
Fig. 6 is a similar view taken at right angles to Fig. 5.

The knot that is being tied in Fig. 4 will lie on the side of the shank 12. A knot is next tied in exactly the same manner on the opposite or other side of the shank. These knots, with the same relative arrangement of the cords for each one thereof are tied alternately on opposite sides of the shank 12 at positions that are substantially diametrically opposite each other relative to the shank 12. This results in the formation of stripes by the knot portions produced by the cords 16 and 17, resulting in contrasting colored stripes 25 and 26 running lengthwise of the shank 12. The tying of the knots alternately on opposite sides of the shank 12 is continued lengthwise of the body portion in closely adjacent arrangement until the length of body portion that is desired is formed on the shank. Then the free end portion of the thread 13 is utilized for tying down the last pair of knots formed, as indicated at 30 in Figs. 5 and 6, the ends 23 and 24 extending beyond the last knot being cut off.

A hackle having a body portion 31 and hairs or similar strands 32 extending therefrom is also tied on the shank 12 by means of the end 21 of the thread to overlie the end of the body portion nearest the eye 10, if such a hackle is desired.

By a single knot is meant the type of knot that is illustrated in Fig. 4, which is substantially the same type of knot that is used in forming the foundation portion of a single or double bow knot, but without forming any bow thereon. Such a knot, when tied to encompass a member such as the shank 12, serves somewhat the same purpose as a hitch, in that it firmly anchors and secures to the shank 12 the two cords of which the knot is tied.

Each succeeding knot, when tied on the shank in this manner, holds the preceding knot tightly in position and as the last single knot is tied down by means of the thread 13 the entire row of knots will be firmly anchored on the shank 12 so that a very rugged and long lived fishing lure body portion is formed in this manner.

In order to increase the durability of the lure, it is preferred, before the tying of the knots in cords 16 and 17 is begun (i. e., at the stage illustrated by Fig. 3), to coat the shank of the hook and the parallel strands 16 and 17 secured thereto with a cementitious binding material. While this cement still is moist and uncured, the tying of the knots in cords 16 and 17 is carried out so that each knot is independently cemented to the shank of the hook. Should any particular knot subsequently be damaged by abrasive action or the like, the adjoining knots still will remain firmly secured to the hook by the cement so there is no damage of the cords 16 and 17 unraveling or becoming untied. To further increase the durability of the lure, an additional coating of liquid binding material may be applied to the body after the weaving or tying has been completed (i. e., at the stage illustrated by Figs. 5 and 6).

From the foregoing it will be seen that the invention is well adapted to attain all of the ends and objects hereinbefore set forth together with other advantages which are obvious and which are inherent to the structure.

It will be understood that certain features and subcombinations are of utility and may be employed without reference to other features and subcombinations. This is contemplated by and is within the scope of the appended claims.

Inasmuch as various modifications of the invention may be made without departing from the scope thereof, it is to be understood that all matter herein set forth or shown in the accompanying drawings is to be interpreted as illustrative and not in a limiting sense.

Having described the invention, we claim:

1. A fishing lure having a body portion formed on the shank of a hook, said body portion comprising rows of knots extending longitudinally of said shank, said knots embracing said shank and being alternately tied on opposite sides thereof.

2. A fishing lure having a body portion formed on the shank of a hook, said body portion comprising rows of knots extending longitudinally of said shank, said knots embracing said shank and being formed of two cords of contrasting colors.

3. A fishing lure having a body portion formed on the shank of a hook, said body portion comprising rows of knots extending longitudinally of said shank and being formed of two cords of contrasting colors, the knots of each row being tied to have the cord of the same color on the outside of adjacent knots in alignment longitudinally of said shank.

4. A fishing lure having a body portion formed on the shank of a hook, said body portion comprising rows of knots extending longtiudinally of said shank, said knots embracing said shank being alternately tied on opposite sides thereof, and formed of two cords of contrasting colors.

5. A fishing lure having a body portion formed on the shank of a hook, said body portion comprising rows of knots extending longitudinally of said shank, said knots embracing said shank being alternately tied on opposite sides thereof and formed of two cords of contrasting colors, the knots of each row being tied to have the cord of the same color on the outside of adjacent knots in alignment longitudinally of said shank.

6. A fishing lure having a body portion formed on the shank of a hook, said body portion comprising rows of knots extending longitudinally of said shank, said knots embracing said shank being alternately tied on opposite sides thereof and formed of two cords of contrasting colors, the knots of each row being tied to have the cord of the same color on the outside of adjacent knots in alignment longitudinally of said shank, and having a hackle secured to said shank at one end of said rows of knots.

WILLIAM F. SIVEY.
DELIA I. SIVEY.

REFERENCES CITED

The following references are of record in the file of this patent:

UNITED STATES PATENTS

| Number | Name | Date |
|---|---|---|
| 1,640,599 | Conn | Aug. 30, 1927 |
| 2,034,832 | Raycraft | Mar. 24, 1936 |
| 2,082,305 | Strong | June 1, 1937 |
| 2,148,799 | Bilinski | Feb. 28, 1939 |